(12) United States Patent
Muramoto et al.

(10) Patent No.: US 10,054,027 B2
(45) Date of Patent: Aug. 21, 2018

(54) EXHAUST PURIFICATION APPARATUS FOR INTERNAL COMBUSTION ENGINE

(71) Applicant: ISUZU MOTORS LIMITED, Tokyo (JP)

(72) Inventors: Tsutomu Muramoto, Fujisawa (JP); Nobutaka Ishii, Fujisawa (JP); Futoshi Nakano, Fujisawa (JP); Takashi Yamashita, Fujisawa (JP); Satoshi Kanekiyo, Fujisawa (JP); Kenji Hagio, Fujisawa (JP); Katsushi Osada, Fujisawa (JP); Tsugio Chinone, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 61 days.

(21) Appl. No.: 15/307,618

(22) PCT Filed: Feb. 12, 2015

(86) PCT No.: PCT/JP2015/053786
§ 371 (c)(1),
(2) Date: Oct. 28, 2016

(87) PCT Pub. No.: WO2015/129463
PCT Pub. Date: Sep. 3, 2015

(65) Prior Publication Data
US 2017/0074144 A1    Mar. 16, 2017

(30) Foreign Application Priority Data
Feb. 28, 2014   (JP) ................................. 2014-038947

(51) Int. Cl.
*F01N 9/00* (2006.01)
*F01N 3/025* (2006.01)
(Continued)

(52) U.S. Cl.
CPC ......... *F01N 9/002* (2013.01); *B01D 46/0061* (2013.01); *B01D 53/94* (2013.01);
(Continued)

(58) Field of Classification Search
CPC ............................. F01N 3/0835; F01N 3/0871
See application file for complete search history.

(56) References Cited

U.S. PATENT DOCUMENTS

2004/0105801 A1* 6/2004 Sato ..................... B01D 53/944
423/212
2008/0016853 A1* 1/2008 Zhang ................... F01N 3/0253
60/286

FOREIGN PATENT DOCUMENTS

EP       1400664 A1     3/2004
JP       H08-144802     6/1996
(Continued)

OTHER PUBLICATIONS

International Search Report and Written Opinion for PCT App No. PCT/JP2015/053786 dated Apr. 7, 2015, 21 pgs.
(Continued)

*Primary Examiner* — Jonathan Matthias
(74) *Attorney, Agent, or Firm* — Procopio, Cory, Hargreaves & Savitch LLP

(57) ABSTRACT

There is provided an exhaust purification apparatus for an internal combustion engine in which a catalyst capable of adsorbing and oxidizing hydrocarbon is provided in an exhaust pipe, the exhaust purification apparatus including temperature detection means for detecting a temperature of the catalyst, estimation means for accumulating a time during which the temperature of the catalyst detected by the temperature detection means is equal to or less than a predetermined temperature, and estimating an amount of hydrocarbon adsorbed on the catalyst from the accumulated time, and control means for controlling fuel ejection of the
(Continued)

internal combustion engine in a first ejection mode in which the temperature of the catalyst is increased to a temperature where hydrocarbons adsorbed on the catalyst are oxidized, in a case in which the amount of hydrocarbons estimated by the estimation means exceeds a predetermined upper limit.

6 Claims, 4 Drawing Sheets

(51) Int. Cl.

| | | |
|---|---|---|
| *F01N 3/08* | (2006.01) | |
| *F01N 3/10* | (2006.01) | |
| *B01D 53/94* | (2006.01) | |
| *B01D 46/00* | (2006.01) | |
| *F01N 3/035* | (2006.01) | |
| *F01N 11/00* | (2006.01) | |
| *F02D 41/02* | (2006.01) | |
| *F02D 41/38* | (2006.01) | |
| *F01N 13/00* | (2010.01) | |

(52) U.S. Cl.
CPC ....... *B01D 53/944* (2013.01); *B01D 53/9495* (2013.01); *F01N 3/025* (2013.01); *F01N 3/0253* (2013.01); *F01N 3/035* (2013.01); *F01N 3/0814* (2013.01); *F01N 3/0835* (2013.01); *F01N 3/0871* (2013.01); *F01N 3/103* (2013.01); *F01N 9/00* (2013.01); *F01N 11/002* (2013.01); *F02D 41/025* (2013.01); *F02D 41/027* (2013.01); *F02D 41/029* (2013.01); *F02D 41/0245* (2013.01); *F02D 41/3809* (2013.01); *B01D 53/9477* (2013.01); *B01D 2255/912* (2013.01); *B01D 2257/702* (2013.01); *B01D 2258/012* (2013.01); *B01D 2279/30* (2013.01); *F01N 13/0097* (2014.06); *F01N 2250/06* (2013.01); *F01N 2430/08* (2013.01); *F01N 2430/085* (2013.01); *F01N 2560/06* (2013.01); *F01N 2570/12* (2013.01); *F01N 2610/03* (2013.01); *F01N 2900/1404* (2013.01); *F01N 2900/1602* (2013.01); *F02D 2041/389* (2013.01); *F02D 2200/0802* (2013.01); *Y02T 10/47* (2013.01)

(56) References Cited

FOREIGN PATENT DOCUMENTS

| | | |
|---|---|---|
| JP | H11-022449 | 1/1999 |
| JP | 2002-364345 A | 12/2002 |
| JP | 2008-128062 A | 6/2008 |
| JP | 2010-265873 A | 11/2010 |
| JP | 2013-142377 A | 7/2013 |

OTHER PUBLICATIONS

Extended European Search Report for EP App No. 15755930.3 dated Nov. 20, 2017, 6 pgs.

\* cited by examiner

EXHAUST PURIFICATION APPARATUS FOR INTERNAL COMBUSTION ENGINE

CROSS-REFERENCE TO RELATED APPLICATIONS

This application is a U.S. National Stage entry of PCT Application No. PCT/JP2015/053786, filed on Feb. 12, 2015, which claims priority to JP Application No. 2014-038947 filed Feb. 28, 2014. The contents of the foregoing are incorporated by reference.

TECHNICAL FIELD

The present invention relates to an exhaust purification apparatus for an internal combustion engine.

BACKGROUND ART

In an internal combustion engine such as a diesel engine, nitrogen oxides, particulate matter (PM), and the like are generated because of combustion. In a vehicle in which an internal combustion engine is used for power, in order to suppress discharging of these materials with exhaust gas, an oxidation catalyst (DOC) and a purifying apparatus such as a diesel particulate filter (DPF) are provided in an exhaust passage.

The DPF is an apparatus for collecting PM contained in exhaust gas by using a filter. While the DPF is used, PM is accumulated, and thus functions thereof deteriorate due to clogging of the filter. Therefore, the accumulated PM is combusted by feeding high temperature exhaust gas to the DPF. As a method for generating high temperature exhaust gas, a method of using heat which is generated by allowing unburnt hydrocarbons (HC) to be included in the exhaust gas, adsorbing the HC on a DOC provided on an upstream side, and oxidizing (combusting) the HC is generally used.

However, when the DOC exceeds a usable temperature, the DOC is likely to be degraded, and functions thereof deteriorate. Therefore, when HC is adsorbed and accumulated in the DOC more than necessary, the DOC exceeds the usable temperature at the time of combustion, and thus there is a possibility that the DOC is degraded.

Here, in the exhaust purification apparatus of Patent Literature 1, a passage for guiding exhaust gas to an adsorbent and a passage which does not pass through the adsorbent are provided, and when an estimated value of an amount of accumulated HC in the adsorbent reaches a predetermined value or more, high temperature exhaust gas is guided to the adsorbent by opening the former passage so that the accumulated HC is combusted.

In addition, in a HC adsorbing catalyst of Patent Literature 2, if the amount of accumulated HC which is estimated reaches a predetermined amount, an after-ejection (ejection in expansion cycle) is performed using an injector, a temperature of the exhaust gas is increased, and HC is burnt. In order to estimate the amount of the accumulated HC, there is a method of calculating the amount based on a change of HC concentration between ahead of and behind the HC adsorbing catalyst (former), or a method of estimating an amount of flow of HC to the HC adsorbing catalyst from a measured value of an air fuel ratio sensor and calculating the amount using the estimated amount of flow of HC, an adsorption efficiency of the HC adsorbing catalyst, and an amount of HC-oxidation/desorption of the HC adsorbing catalyst (latter).

CITATION LIST

Patent Literature

[Patent Literature 1] JP-A-H11-22449
[Patent Literature 2] JP-A-2010-265873

SUMMARY OF INVENTION

Technical Problem

However, in an exhaust purification apparatus of Patent Literature 1, two exhaust passages need to be provided, and thus an increase in the number of components or complexity of a structure thereof is caused.

In addition, in Patent Literature 2, at the time of estimating the amount of accumulated HC, a HC concentration sensor needs to be provided ahead of and behind the HC adsorbing catalyst in the former method, and thus an increase in the number of components or complexity of a structure thereof occurs. Meanwhile, the latter method does not take into account the fact that the adsorption efficiency of the HC adsorbing catalyst and the amount of HC-oxidation/desorption of the HC adsorbing catalyst also change due to the amount of HC being accumulated in the HC adsorption catalyst. Therefore, there is a possibility that a fuel efficiency may deteriorate due to excess frequency of burning of HC, and conversely, the temperature may increase to equal to or more than a usable temperature because an amount of accumulated HC at the time of incineration exceeds an appropriate amount.

Here, an object of the invention is to provide an exhaust purification apparatus for an internal combustion engine which combusts hydrocarbons adsorbed to a catalyst at an appropriate timing while avoiding an increase in the number of components and the complexity of a structure.

Solution to Problem

In order to solve the above-described object, the invention provides an exhaust purification apparatus for an internal combustion engine in which a catalyst capable of adsorbing and oxidizing hydrocarbons is provided in an exhaust pipe, the exhaust purification apparatus including: temperature detection means for detecting a temperature of the catalyst; estimation means for accumulating a time during which the temperature of the catalyst detected by the temperature detection means is equal to or less than a predetermined temperature, and estimating an amount of hydrocarbons adsorbed on the catalyst from the accumulated time; and control means for controlling fuel ejection of the internal combustion engine in a first ejection mode in which the temperature of the catalyst is increased to a temperature where hydrocarbons adsorbed on the catalyst are oxidized, in a case in which the amount of hydrocarbons estimated by the estimation means exceeds a predetermined upper limit.

Subtraction may be performed to the accumulated time when the temperature of the catalyst detected by the temperature detection means exceeds the predetermined temperature continuously for a predetermined time.

The exhaust purification apparatus may further include a filter that is provided in the exhaust pipe downstream from the catalyst and collects particulate matter in exhaust gas, and when the particulate matter accumulated in the filter exceeds a predetermined amount, the control means may control the fuel ejection of the internal combustion engine in a second ejection mode in which the temperature of the catalyst is increased to a combustion temperature of the particulate matter.

The control means may prohibit performing the second ejection mode while the first ejection mode is performed.

BRIEF DESCRIPTION OF DRAWINGS

FIG. 2-1 is a diagram describing a fuel ejecting control in a general mode.

FIG. 2-2 is a diagram describing the fuel ejecting control in a HC purge mode.

FIG. 2-3 is a diagram describing the fuel ejecting control in a temperature raising process of a DPF regeneration mode.

FIG. 2-4 is a diagram describing the fuel ejecting control in a HC supplying process of the DPF regeneration mode.

FIG. 3 is a diagram illustrating a temperature change (solid line) of a DOC in HC purge, and a change (dashed line) of an amount of the HC being adsorbed.

FIG. 4 is a diagram illustrating an example of a change of an exhaust gas temperature according to driving of an engine.

DESCRIPTION OF EMBODIMENTS

Hereinafter, an exhaust purification apparatus according to an embodiment of the invention will be described on the basis of attached drawings. A same number is given to a same component, and a name and a function thereof are also same. Therefore, detailed description thereof will not be repeated.

<Configuration of Internal Combustion Engine and Exhaust Purification Apparatus>

Figure 1:
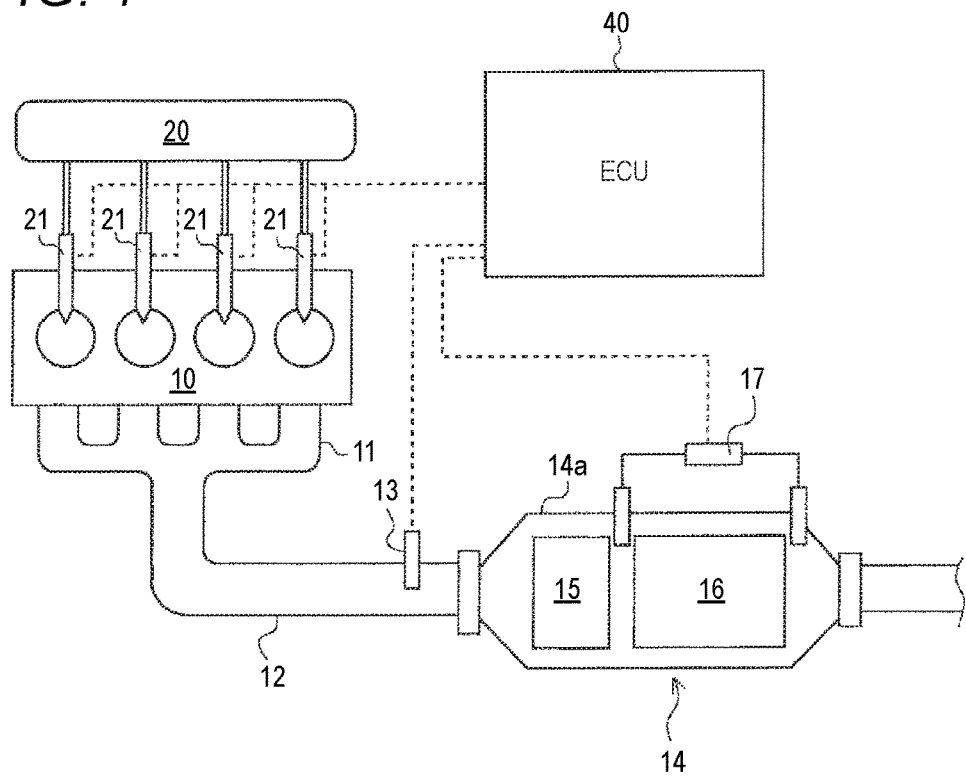
FIG. 1 is a view illustrating an internal combustion engine and an exhaust purification apparatus according to an embodiment of the invention.

FIG. 1 is a view illustrating a configuration of an internal combustion engine and an exhaust purification apparatus according to an embodiment of the invention. In the embodiment, as the internal combustion engine, a diesel engine 10 (hereinafter, simply referred to as engine) is used.

In each cylinder of an engine 10, an injector 21 which directly ejects a high pressure fuel accumulated in a common rail 20 into each cylinder is provided. An ejection amount of fuel and an ejection timing of fuel of the injector 21 are controlled according to an ejection instruction signal which is input from an electronic control unit (hereinafter, referred to as ECU) 40. In the embodiment, material ejection of the injector 21 can be switched from a general mode, a HC purge mode, and a DPF regeneration mode. Each mode will be described later in detail.

An exhaust gas passage 12 discharging the exhaust gas to the air is connected to an exhaust manifold 11 of the engine 10. In the exhaust gas passage 12, an exhaust gas temperature sensor 13, a post-exhaust processing device 14, and the like are provided sequentially from an upstream side of exhausting.

The exhaust gas temperature sensor 13 detects an exhaust gas temperature (hereinafter, refer to detection temperature) $\theta$ at an upstream side than the post-exhaust processing device 14. The detection temperature $\theta$ detected by the exhaust gas temperature sensor 13 is transmitted in real time to an ECU 40 which is electrically connected.

The post-exhaust processing device 14 is configured with a DOC 15 and a DPF 16 which are disposed inside a catalyst case 14a sequentially from the upstream side of exhausting. Also, a numeral 17 indicates a differential pressure sensor which detects the a head-and-behind differential pressure $\Delta P$ of the DPF. The ahead-and-behind differential pressure $\Delta P$ detected by the differential pressure sensor 17 is transmitted in real time to the ECU 40 electrically connected.

The DOC 15 is formed by carrying a catalyst component on a surface of a ceramic carrier such as a cordierite honeycomb structure, or the like. In addition, an adsorbent for adsorbing HC contained in the exhaust gas is included in the DOC 15. The adsorbent is formed of a material having a three dimensional structure for capturing HC molecules such as zeolite. The adsorbed HC is oxidized (combusted), and thus the exhaust gas temperature can be increased. However, when unburnt HC generated in the DPF regeneration and a general driving to be described later is accumulated in the DOC 15, HC of an excess amount is combusted, and thus there is a possibility that the exhaust gas temperature exceeds a use upper limit temperature $\theta_L$. Therefore, the HC purge is performed in order to combust and remove the accumulated HC. The details of the HC purge will be described later.

The DPF 16 is formed by disposing a plurality of cells divided using porous partition walls along a flowing direction of exhausting and alternately sealing an upstream side and a downstream side of the cells. The DPF 16 collects a particulate matter (hereinafter, refer to PM) in the exhaust gas on pores or a surface (filter) of partition walls. When an accumulate amount of PM reaches a predetermined amount, so called the DPF regeneration which removes the predetermined amount by firing is performed. Detailed description of the DPF regeneration will be described later.

<Fuel Ejecting Control>

(1) General Mode

Figures 1, 2:
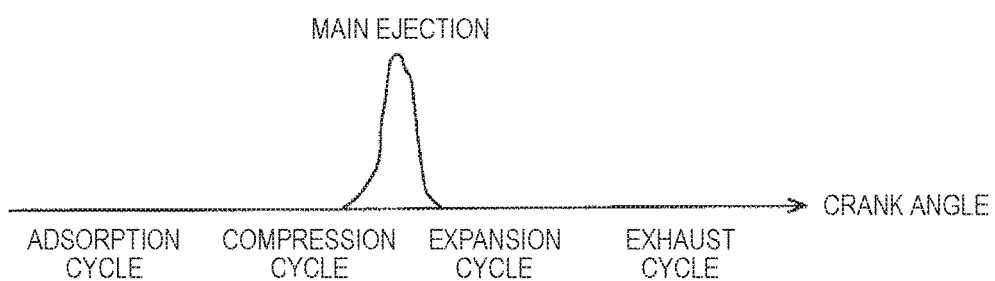
Figure 2:
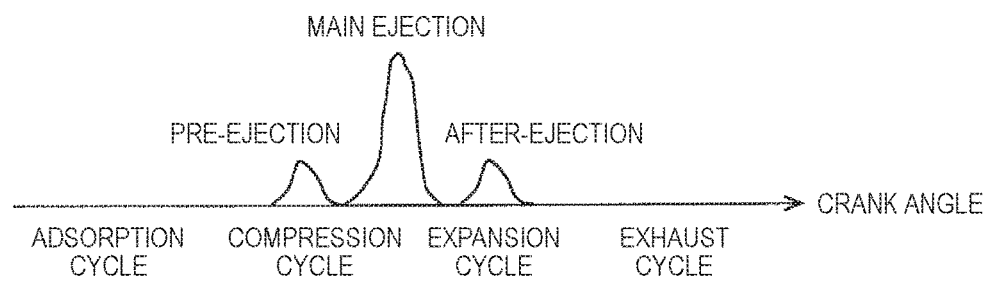

FIG. 2-1 is a diagram describing a fuel ejecting control in a general mode. In the general mode, fuel ejection (main ejection) is performed at a top dead point or a vicinity thereof. Also, in the general mode described here, the main ejection is performed once, but it is only an example, and ejection may be performed separately several times (multiple ejection) in accordance with a necessary performance.

(2) HC Purge Mode

FIG. 2-2 is a diagram describing a fuel ejecting control in a HC purge mode. In the HC purge mode, in addition to the main ejection, an ejection by an ejection amount less than an amount of fuel ejected in the main ejection is respectively performed once before and after the main ejection (pre-ejection and after-ejection). In the HC purge mode, the exhaust gas temperature becomes higher than that of the general mode, and a temperature of the DOC 15 is increased up to a target temperature $\theta_B$ higher than a temperature (active temperature $\theta_A$) where HC can be combusted. Also, a control of the HC purge mode described herein is only an example, and the other type of control may be used as long as a temperature of the DOC 15 is increased up to the target temperature $\theta_B$.

(3) DPF Regeneration Mode

Figures 2, 3:
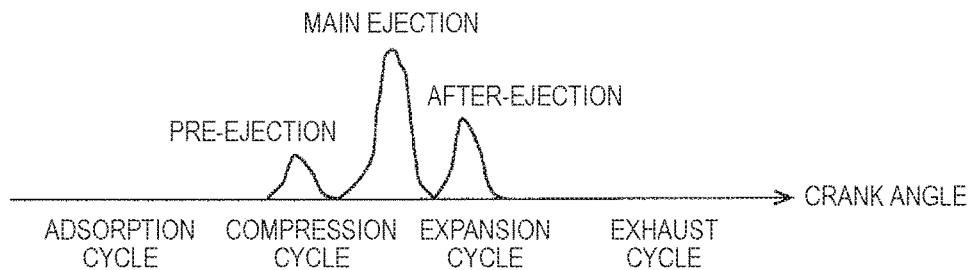
Figures 2, 3, 4:
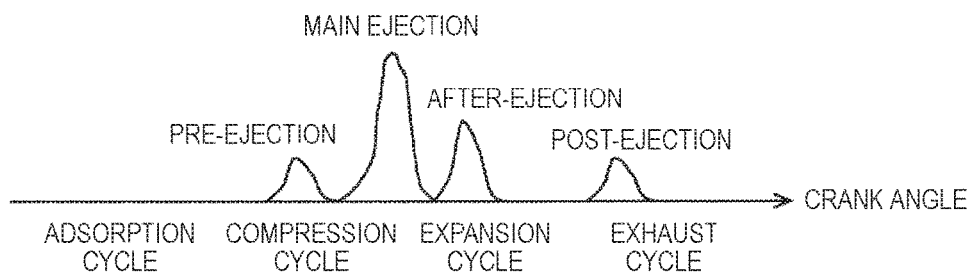
Figure 3:
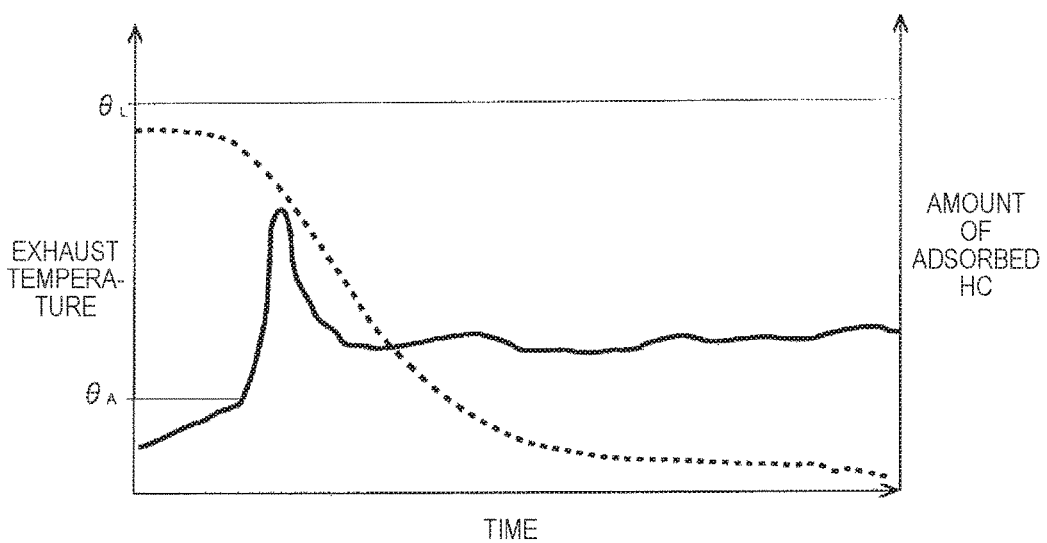
Figure 4:
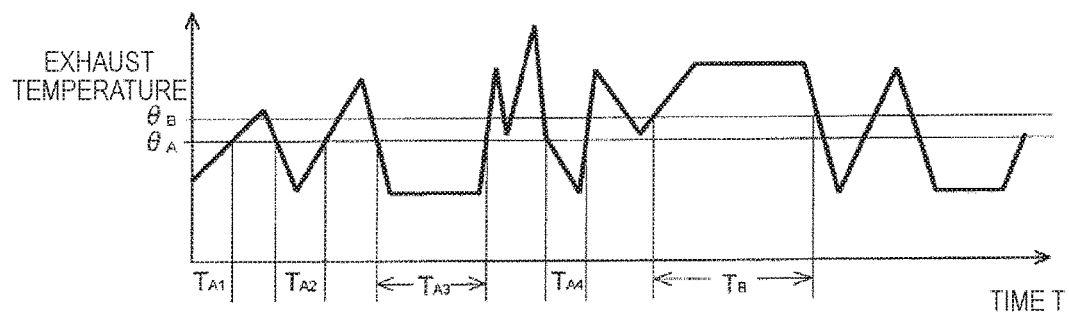

In the DPF regeneration mode, at first, ejection for increasing the temperature of the DOC 15 is performed (temperature raising process of FIG. 2-3), and after that, it is switched to ejection for supplying HC to the DOC 15 (HC supplying process of FIG. 2-4).

FIG. 2-3 is diagram describing a fuel ejecting control in a temperature raising process of the DPF regeneration mode. In the temperature raising process, the pre-ejection, the main ejection, and the after-ejection are performed. The ejection amount of the after-ejection in the temperature raising process is much more than that of the after-ejection in the HC purge mode. The temperature of the DOC 15 is increased by the ejection in the temperature raising process, and it is switched to the HC supplying process if the temperature reaches a predetermined temperature higher than the target temperature $\theta_B$.

FIG. 2-4 is a diagram describing the fuel ejecting control in the HC supplying process of the DPF regeneration mode. In the HC supplying process, in addition to fuel ejection of the temperature raising process, fuel ejection is further performed (post-ejection) at an exhaust cycle after combustion. In this ejection mode, fuel by the post-ejection is not combusted, and is included in the exhaust gas. Therefore, HC contained in the fuel is supplied to the DOC 15. Since the temperature of the DOC 15 has been sufficiently increased, the supplied HC is combusted by the DOC 15. Here, the control of the post-ejection is not limited thereto, may be a control to perform ejection in multiple times as long as the ejection is performed after combustion and an unburnt fuel is supplied to the DOC 15 by exhaust.

<HC Purge>

FIG. 3 is a diagram illustrating a temperature change (solid line) of the DOC 15 and a change (dashed line) of an adsorption amount of HC in the HC purge. In the drawing, the use upper limit temperature $\theta_L$ indicates a temperature in order not to cause a significant degrading of the DOC 15.

When the HC purge starts, fuel ejection of the HC purge mode is performed, and the temperature of the DOC 15 is also increased according to an increase of the exhaust gas temperature. If the temperature of the DOC 15 reaches the active temperature $\theta_A$, the HC adsorbed to the DOC 15 starts to be combusted. Accordingly, the temperature of the DOC 15 is further increased, but since the amount of adsorbed HC is suppressed to be lower than a predetermined amount by a control to be described later, the temperature does not reach to the use upper limit temperature $\theta_L$.

When the amount of HC adsorbed to the DOC 15 is reduced by the combustion of HC and the HC is sufficiently removed, the HC purge is finished. Time from starting to finishing of the HC purge is appropriately adjusted according to conditions such as an amount of HC to be removed, a size of the DOC 15, and an amount of flowing of the exhaust gas.

<Execution Condition of HC Purge>

FIG. 4 is a diagram illustrating an example of a change of the exhaust gas temperature according to driving of the engine 10. In the embodiment, the amount of adsorbed HC of the DOC 15 is estimated based on a relationship of temperature $\theta$ and time T detected by the exhaust gas temperature sensor 13, and it is determined whether to perform the HC purge or not. This estimation and determination are performed by the ECU 40.

In the embodiment, a time during which the detection temperature $\theta$ is equal to or less than the active temperature $\theta_A$ is integrated, and when the integrated time $\Sigma T$ ($=T_{A1}+T_{A2}+T_{A3}+T_{A4}+$ . . . ) becomes a predetermined value $T_A$, it is estimated that the amount of adsorbed HC in the DOC 15 has reached an amount to be HC-purged, and the start of the HC purge is determined. The $\theta_A$ and $T_A$ can be, for example, calculated experimentally, and further, these can be appropriately adjusted by, for example, expecting drop of temperature between the exhaust gas temperature sensor 13 and the DOC 15. In addition, the amount to be HC-purged is an amount of which the temperature of the DOC 15 does not reach the use upper limit temperature $\theta_L$ at the time of combustion of HC in the DOC 15.

If it does not become equal to or more than the active temperature OA, the combustion of HC does not occur. Therefore, an estimation method of the amount of adsorbed HC of the embodiment, in which it is determined that HC is accumulated when the temperature of the DOC 15 is less than the active temperature $\theta_A$, is an accurate and stable method.

Further, in addition to these conditions, in the embodiment, when the exhaust gas temperature becomes a predetermined temperature, for example, a state in which the temperature is equal to or more than the target temperature $\theta_B$ ($>\theta_A$) is continuously maintained for equal to or more than a predetermined time $T_B$, a value of $\Sigma T$ is reset ($\Sigma T=0$). The reason is because, if the exhaust gas temperature is sufficiently high, it can be estimated that the HC adsorbed to the DOC 15 is sufficiently combusted. Here, in order to set the temperature inside the DOC 15 to be $\theta_B$, by expecting drop of the temperature between the exhaust gas temperature sensor 13 and the DOC 15, temperature used for determination may be set to, for example, $\theta_B+\Delta$. In addition, when $\Sigma T=(T_{A1}+T_{A2}+T_{A3}+T_{A4}+$ . . . )$-kT_B$ (k is a coefficient determined by combustion efficiency of HC, and for example, can be calculated by experiment) reaches a predetermined value, the HC purge may set to be started ($\Sigma T \geq 0$).

Figure 5:
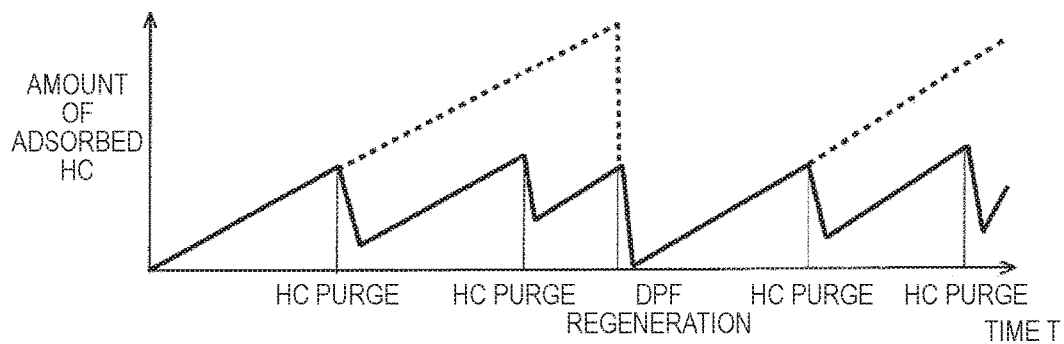
FIG. 5 is a diagram illustrating a change of an amount of adsorbed HC in the DOC in a case in which the HC purge is performed (solid line), and a case in which the HC purge is not performed (dashed line).

FIG. 5 is a diagram illustrating a change of the amount of adsorbed HC in the DOC 15 in a case in which the HC purge is performed (solid line), and a case in which the HC purge is not performed (dashed line). According to driving of the engine 10, a small amount of unburnt HC included in the exhaust gas is accumulated, and an adsorption amount of HC is increased. Then, when it is determined that the amount of adsorbed HC has reached a predetermined amount as described above, and the HC purge is performed, HC is removed. Therefore, according to the embodiment, the amount of adsorbed HC in the DOC 15 is controlled not to exceed a predetermined amount. In addition, therefore, the adsorption amount of HC does not become great as shown by the dashed line and thus does not exceed the use upper limit temperature $\theta_L$ at the time of the DPF regeneration to be described later. In addition, since the HC purge is not performed more than necessary, consumption of unnecessary fuel is suppressed.

The estimation of the amount of adsorbed HC as described above, that is, a control method for determining whether or not the HC purge is to be performed is simply an example, and for example, the determination may be made on the basis of an integrated value of a distance as much as a vehicle has traveled in a state in which the exhaust gas temperature is equal to or lower than the $\theta_A$.

<DPF Regeneration>

Figure 6:
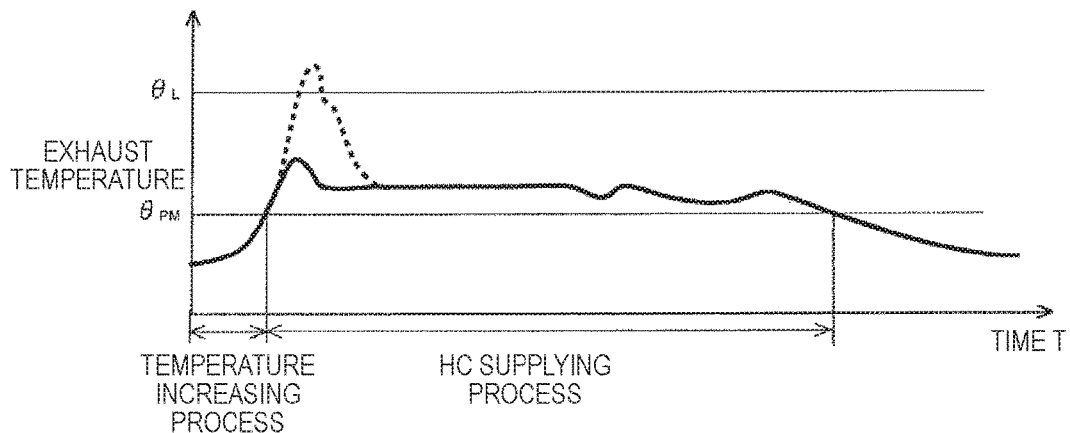
FIG. 6 is a diagram illustrating a temperature change of the DOC in a DPF regeneration.

FIG. 6 is a diagram illustrating the temperature change of the DOC 15 in the DPF regeneration. In the drawing, a solid line indicates temperature changes in a case in which the HC purge of the embodiment is performed, and a dashed line indicates the temperature change in a case in which the HC purge is not performed. The DPF regeneration is performed by combusting unburnt fuel (HC) in the exhaust gas using the DOC 15 so as to increase the temperature of the DOC 15 and increase the exhaust gas temperature flowing into the DPF 16 up to a PM combustion temperature.

When the PM accumulated in the DPF 16 is increased, the ahead-and-behind differential pressure ΔP of the DPF 16 is increased. Therefore, in the embodiment, a starting condition of the DPF regeneration is when the ahead-and-behind differential pressure ΔP detected by the differential pressure sensor 17 is equal to or more than a predetermined value. However, in the embodiment, the ahead-and-behind differential pressure ΔP is not detected during performing the HC purge, and the DPF regeneration is not started. It is because that a detection accuracy of the differential pressure sensor 17 during performing the HC purge is deteriorated. In addition, it is also because that there is a possibility that the temperature of HC reaches the use upper limit temperature $\theta_L$ when HC is further supplied and combusted in a state in which the HC is accumulated.

Here, the embodiment (solid line) will be described. When the DPF regeneration is started, fuel ejection of the DPF regeneration mode is started. First, the DOC 15 is increased by the fuel ejection in the temperature raising process. After that, when it is switched to the HC supplying process and HC is supplied to the DOC 15 and combusted, the temperature of the DOC 15 is further increased, and reaches $\theta_{PM}$. A high temperature exhaust gas passed through the DOC 15 flows into the DPF 16 at a temperature equal to or more than the PM combustion temperature.

Meanwhile, in a case in which excess HC is accumulated in the DOC 15 without performing the HC purge of the embodiment, when the DOC 15 is increased as shown by the dashed line, the temperature is rapidly increased, and the temperature of the DOC 15 reaches the use upper limit temperature $\theta_L$. When the temperature of the DOC 15 reaches the use upper limit temperature $\theta_L$, a three dimensional structure of an adsorbent included in the DOC 15 collapses, and an adsorption performance of HC is deteriorated.

Effect of Embodiment

The HC purge of the embodiment can be performed by rewriting a program of the ECU 40, and the engine 10 and the injector 21 do not need to be modified in design, or the like for this control. Further, determination of the whether to perform the HC purge is performed on the basis of the detection temperature θ by the exhaust gas temperature sensor 13, and the exhaust gas temperature sensor 13 is a component also used for a controlling a driving state of the engine 10, a temperature at the time of the DPF regeneration, and the like.

In addition, as described above, a method of determining whether or not HC is accumulated using the temperature of the DOC 15 (detection temperature θ of exhaust gas temperature sensor 13), and estimating the amount of adsorbed HC in the embodiment is an accurate and stable method. Therefore, when the HC purge is determined to be performed or not based on this estimation, the HC purge can be performed at an accurate timing.

Therefore, according to the embodiment, the exhaust purification apparatus for the internal combustion engine which combusts hydrocarbon adsorbed to the DOC 15 at an appropriate timing while avoiding an increase in the number of components and the complexity of a structure can be provided.

Other Embodiment

Figure 7:
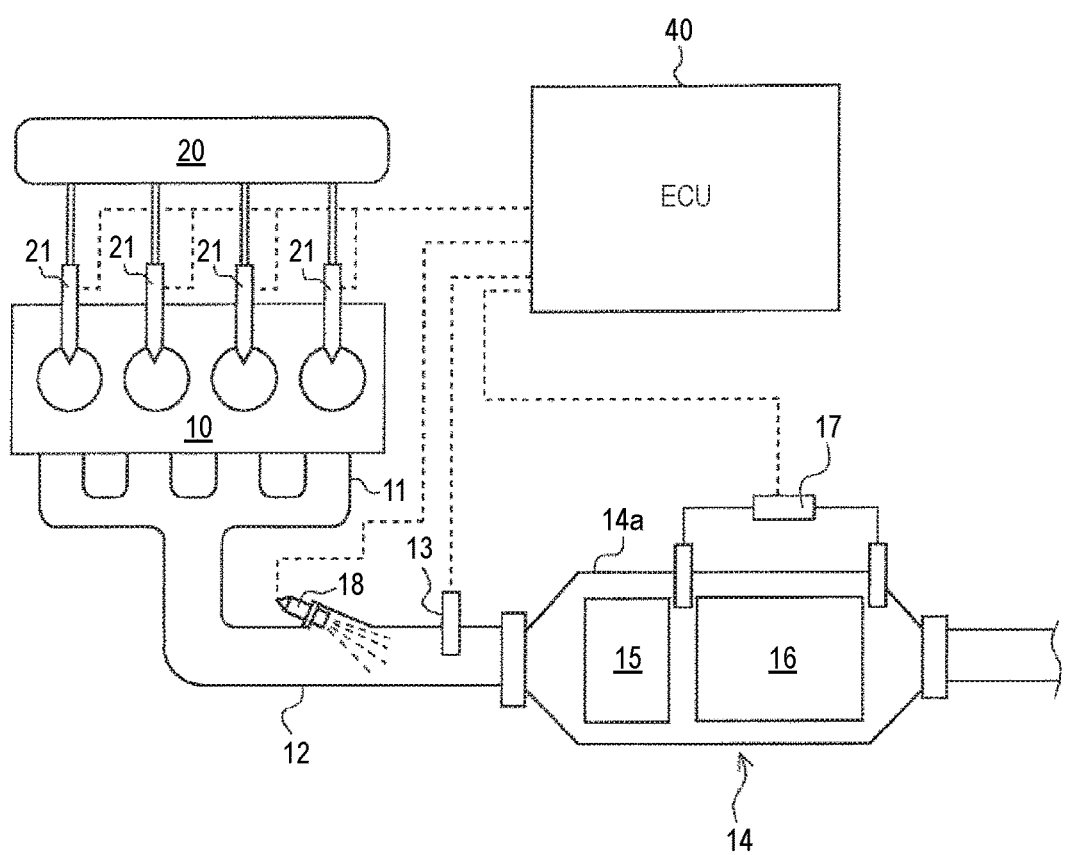
FIG. 7 is a view illustrating an internal combustion engine and an exhaust purification apparatus according to another embodiment of the invention.

FIG. 7 is a view illustrating the internal combustion engine and the exhaust purification apparatus according to another embodiment of the invention. This embodiment is different from the embodiment described above in a configuration in that a fuel ejection nozzle 18 is provided between the engine 10 and the post-exhaust processing device 14.

In this configuration, since fuel (HC) can be supplied from the fuel ejection nozzle 18, as a fuel ejection method using the injector 21 in the DPF regeneration mode, only the process (temperature raising process) of FIG. 2-3 is necessary. In this configuration, since the HC is supplied at the outside of the engine, an exhaust process after combustion like the post-ejection (FIG. 2-4) is not necessary, and thus ejection timing can be set more freely.

The invention claimed is:

1. An exhaust purification apparatus for an internal combustion engine in which a catalyst capable of adsorbing and oxidizing hydrocarbons is provided in an exhaust pipe, the exhaust purification apparatus comprising:
   temperature detection means for detecting a temperature of the catalyst; and
   control means for,
      accumulating a time during which the temperature of the catalyst detected by the temperature detection means is equal to or less than a first predetermined temperature, and estimating an amount of hydrocarbons adsorbed on the catalyst from the accumulated time, wherein the accumulated time is reset when the temperature of the catalyst detected by the temperature detection means becomes a temperature equal to or more than a second predetermined temperature higher than the first predetermined temperature continuously for a predetermined time; and
      controlling fuel ejection of the internal combustion engine in a first ejection mode in which the temperature of the catalyst is increased to a temperature where hydrocarbons adsorbed on the catalyst are oxidized, in a case in which the amount of hydrocarbons estimated by the control means exceeds a predetermined upper limit.

2. The exhaust purification apparatus according to claim 1, further comprising:
   a filter that is provided in the exhaust pipe downstream from the catalyst and collects particulate matter in exhaust gas,
   wherein, when the particulate matter accumulated in the filter exceeds a predetermined amount, the control means controls the fuel ejection of the internal combustion engine in a second ejection mode in which the temperature of the catalyst is increased to a combustion temperature of the particulate matter.

3. The exhaust purification apparatus according to claim 2,
   wherein the control means prohibits performing the second ejection mode while the first ejection mode is performed.

4. An exhaust purification apparatus for an internal combustion engine, the exhaust purification apparatus comprising:
   a catalyst capable of adsorbing and oxidizing hydrocarbons and provided in an exhaust pipe;
   a temperature sensor configured to detect a temperature of the catalyst; and
   a controller configured to:
      accumulate a time during which the temperature of the catalyst detected by the temperature sensor is equal to or less than a first predetermined temperature, and estimate an amount of hydrocarbons adsorbed on the catalyst from the accumulated time;

control fuel ejection of the internal combustion engine in a first ejection mode in which the temperature of the catalyst is increased to a temperature where hydrocarbons adsorbed on the catalyst are oxidized, in a case in which the estimated amount of hydrocarbons exceeds a predetermined upper limit; and reset the accumulated time when the temperature of the catalyst detected by the temperature sensor becomes a temperature equal to or more than a second predetermined temperature higher than the first predetermined temperature continuously for a predetermined time.

5. The exhaust purification apparatus according to claim 4, further comprising:

a filter that is provided in the exhaust pipe downstream from the catalyst and collects particulate matter in exhaust gas, wherein, when the particulate matter accumulated in the filter exceeds a predetermined amount, the controller controls the fuel ejection of the internal combustion engine in a second ejection mode in which the temperature of the catalyst is increased to a combustion temperature of the particulate matter.

6. The exhaust purification apparatus according to claim 5, wherein the controller prohibits performing the second ejection mode while the first ejection mode is performed.

* * * * *